(12) United States Patent
Kim et al.

(10) Patent No.: US 12,242,029 B2
(45) Date of Patent: Mar. 4, 2025

(54) OPTICAL IMAGING SYSTEM

(71) Applicant: SAMSUNG ELECTRO-MECHANICS CO., LTD., Suwon-si (KR)

(72) Inventors: Jong Pil Kim, Suwon-si (KR); Sot Eum Seo, Suwon-si (KR); Ji Su Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 407 days.

(21) Appl. No.: 17/828,469

(22) Filed: May 31, 2022

(65) Prior Publication Data

US 2023/0176329 A1   Jun. 8, 2023

(30) Foreign Application Priority Data

Dec. 7, 2021  (KR) .................. 10-2021-0173555

(51) Int. Cl.
G02B 13/00    (2006.01)
G02B 3/00     (2006.01)
G02B 13/16    (2006.01)

(52) U.S. Cl.
CPC ....... *G02B 13/0035* (2013.01); *G02B 3/0043* (2013.01); *G02B 13/16* (2013.01); *G02B 2003/0093* (2013.01)

(58) Field of Classification Search
CPC .. G02B 13/0035; G02B 3/0043; G02B 13/16; G02B 2003/0093; G02B 13/004; G02B 27/0093; G02B 27/017; G02B 13/0015; G02B 27/0101; G02B 9/12; G02B 13/18
See application file for complete search history.

(56) References Cited

U.S. PATENT DOCUMENTS

| | | |
|---|---|---|
| 2004/0061953 A1 | 4/2004 | Sato |
| 2011/0228157 A1 | 9/2011 | Tang et al. |
| 2011/0279910 A1 | 11/2011 | Tang et al. |
| 2013/0235476 A1 | 9/2013 | Hsieh et al. |
| 2017/0090155 A1 | 3/2017 | Mao |
| 2017/0192204 A1 | 7/2017 | Lee |
| 2018/0011292 A1 | 1/2018 | Lai et al. |
| 2018/0031805 A1 | 2/2018 | Lai et al. |

(Continued)

FOREIGN PATENT DOCUMENTS

| | | |
|---|---|---|
| CN | 202563148 U | 11/2012 |
| CN | 104090347 A | 10/2014 |

(Continued)

OTHER PUBLICATIONS

Korean Office Action issued on Apr. 22, 2024, in counterpart Korean Patent Application No. 10-2021-0173555 (8 pages in English, 6 pages in Korean).

(Continued)

*Primary Examiner* — James C. Jones
(74) *Attorney, Agent, or Firm* — NSIP Law

(57) ABSTRACT

An optical imaging system includes a first lens, a second lens, and a third lens disposed in order from an object side. The optical imaging system satisfies 1.2 mm<TTL<2.0 mm and 0<f3/f<1.0, where TTL is a distance from an object-side surface of the first lens to an imaging plane, f is a focal length of the optical imaging system, and f3 is a focal length of the third lens.

16 Claims, 14 Drawing Sheets

(56) References Cited

U.S. PATENT DOCUMENTS

| | | |
|---|---|---|
| 2020/0174223 A1 | 6/2020 | Huang |
| 2020/0301102 A1 | 9/2020 | Chang |
| 2022/0066141 A1 | 3/2022 | Liu |
| 2022/0137336 A1 | 5/2022 | Ma et al. |
| 2023/0168423 A1 | 6/2023 | Wang et al. |

FOREIGN PATENT DOCUMENTS

| | | | |
|---|---|---|---|
| CN | 104391368 A | 3/2015 | |
| CN | 106980173 A | 7/2017 | |
| CN | 111929818 A | 11/2020 | |
| CN | 112346252 A | 2/2021 | |
| CN | 112987252 A | 6/2021 | |
| CN | 113156616 A | 7/2021 | |
| JP | 2004-163851 A | 6/2004 | |
| JP | 2005-352471 A | 12/2005 | |
| JP | 6926313 B1 | 8/2021 | |
| KR | 10-0662237 B1 | 12/2006 | |
| KR | 10-2007-0122016 A | 12/2007 | |
| KR | 10-2009-0091915 A | 8/2009 | |
| KR | 10-2012-0072755 A | 7/2012 | |
| KR | 10-2014-0076419 A | 6/2014 | |
| KR | 10-2016-0145330 A | 12/2016 | |
| TW | 201133023 A1 | 10/2011 | |
| TW | 201140132 A1 | 11/2011 | |
| TW | 201531735 A | 8/2015 | |
| TW | 201802526 A | 1/2018 | |
| TW | 201804205 * | 2/2018 | ............ G02B 13/00 |
| TW | 201804205 A | 2/2018 | |
| TW | M602212 * | 10/2020 | ............ G02B 11/06 |
| TW | M602212 U | 10/2020 | |

OTHER PUBLICATIONS

Taiwanese Office Action issued on Jun. 9, 2023, in counterpart Taiwanese Patent Application No. 111120964 (5 pages in English, 5 pages in Chinese).

Taiwanese Office Action issued on Dec. 6, 2022, in counterpart Taiwanese Patent Application No. 111120964 (8 pages in English, 7 pages in Chinese).

Taiwanese Office Action issued on Apr. 8, 2024, in counterpart Taiwanese Patent Application No. 113101830 (4 pages in English, 5 pages in Chinese).

Chinese Office Action Issued on Feb. 22, 2024, in Counterpart Chinese Patent Application No. 202210942988.8 (4 Pages in English, 8 Pages in Chinese).

Chinese Office Action issued on Aug. 27, 2024, in corresponding Chinese Patent Application No. 202210942988.8. (5 pages in English, 9 pages in Chinese).

* cited by examiner

OPTICAL IMAGING SYSTEM

CROSS-REFERENCE TO RELATED APPLICATION(S)

This application claims the benefit under 35 USC 119(a) of Korean Patent Application No. 10-2021-0173555 filed on Dec. 7, 2021 in the Korean Intellectual Property Office, the entire disclosure of which is incorporated herein by reference for all.

BACKGROUND

1. Field

The following description relates to an optical imaging system configured to capture an image of an object, such as user eyeball, in close-up.

2. Description of the Background

Augmented reality (AR) devices or virtual reality (VR) devices are configured to provide augmented reality or virtual reality imagery as if users are actually viewing the same. Since it is important to rapidly provide an image corresponding to a user gaze, a camera module is required to rapidly and accurately capture a movement of a user eyeball (for example, iris) without a significant increase in weight and size of a device.

The above information is presented as background information only, to assist in gaining an understanding of the present disclosure. No determination has been made, and no assertion is made, as to whether any of the above might be applicable as prior art with regard to the disclosure.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, and a third lens disposed in order from an object side. The optical imaging system satisfies 1.2 mm<TTL<2.0 mm and 0<f3/f<1.0, where TTL is a distance from an object-side surface of the first lens to an imaging plane, f is a focal length of the optical imaging system, and f3 is a focal length of the third lens.

The optical imaging system may satisfy 0<f1/f<1.5, where f1 is a focal length of the first lens.

The optical imaging system may satisfy −1.0<f2/f<0, where f2 is a focal length of the second lens.

The optical imaging system may satisfy |f1/f2|<3.0, where f1 is a focal length of the first lens, and f2 is a focal length of the second lens.

The optical imaging system may satisfy −2.0<f2/f3<0, where f2 is a focal length of the second lens.

The optical imaging system may satisfy 0.25<BFL/TTL<0.5, where BFL is a distance from an image-side surface of the third lens to the imaging plane.

The optical imaging system may satisfy Bfin/f<0.35, where Bfin is a back focal length of the optical imaging system when an image of an object disposed at infinity is captured.

The optical imaging system may satisfy TTL/f<1.8.

The optical imaging system may satisfy D12/f<0.25, where D12 is a distance from an image-side surface of the first lens to an object-side surface of the second lens.

The optical imaging system may satisfy 1.0≤V1−V3<40, where V1 is an Abbe number of the first lens, and V3 is an Abbe number of the third lens.

The optical imaging system may satisfy 1.0≤V1-V2<40, where V1 is an Abbe number of the first lens, and V2 is an Abbe number of the second lens.

In another general aspect, an optical imaging system includes a first lens, a second lens having negative refractive power, and a third lens disposed in order from an object side. The optical imaging system satisfies 1.4<TTL/f<1.8, where TTL is a distance from an object-side surface of the first lens to an imaging plane, and f is a focal length of the optical imaging system.

The first lens may have a convex image-side surface.

The optical imaging system may satisfy 1.0<f1/f3<2.6, where f1 is a focal length of the first lens, and f3 is a focal length of the third lens.

The optical imaging system may satisfy 0.4<f3/f<0.8, where f3 is a focal length of the third lens.

The optical imaging system may satisfy 4.0<D12/D23<6.0, where D12 is a distance from an image-side surface of the first lens to an object-side surface of the second lens, and D23 is a distance from an image-side surface of the second lens to an object-side surface of the third lens.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
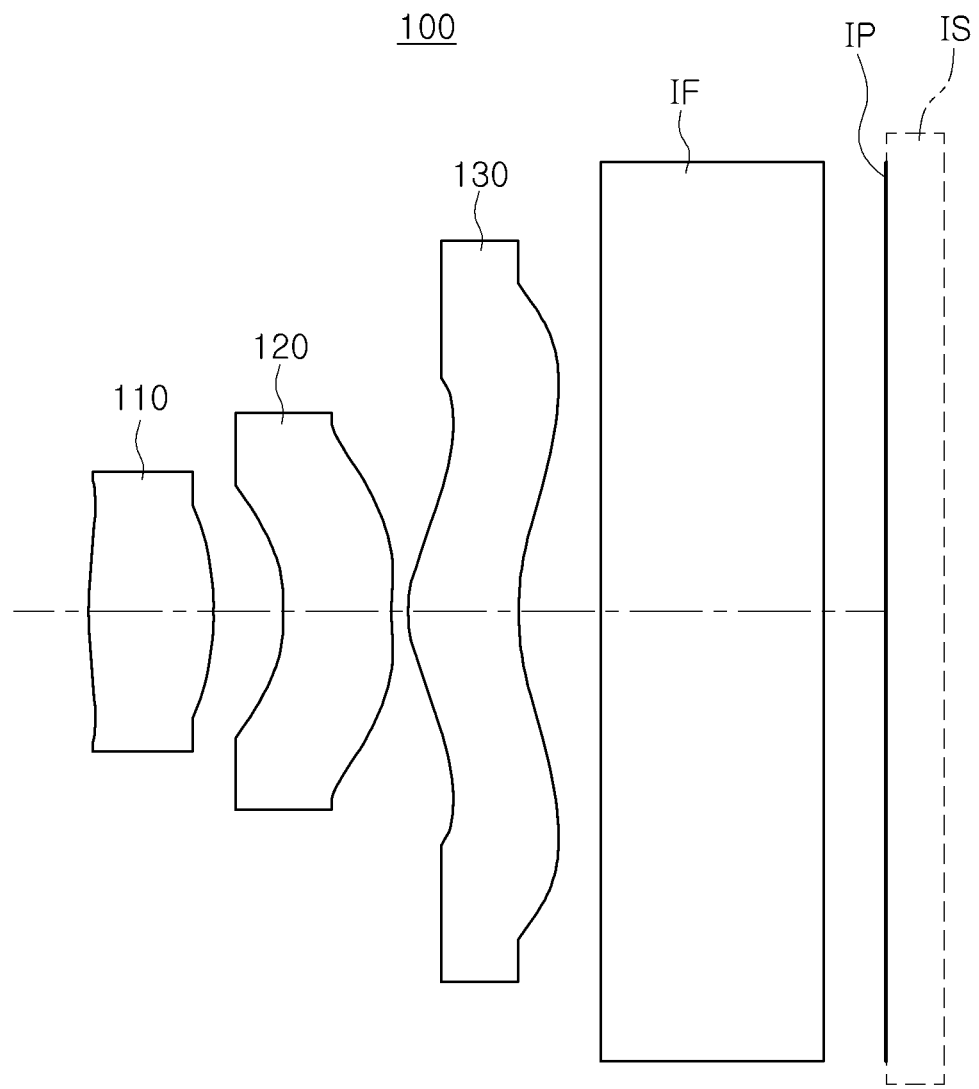
FIG. 1 illustrates a configuration of an optical imaging system according to a first example.

The following detailed description is provided to assist the reader in gaining a comprehensive understanding of the methods, apparatuses, and/or systems described herein. However, various changes, modifications, and equivalents of the methods, apparatuses, and/or systems described herein will be apparent to one of ordinary skill in the art. The sequences of operations described herein are merely examples, and are not limited to those set forth herein, but may be changed as will be apparent to one of ordinary skill in the art, with the exception of operations necessarily occurring in a certain order. Also, descriptions of functions and constructions that would be well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an example or embodiment, e.g., as to what an example or embodiment may include or implement, means that at least one example or embodiment exists in which such a feature is included or implemented while all examples and embodiments are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

In examples, a first lens refers to a lens most adjacent to an object (or a subject), and a seventh lens refers to a lens most adjacent to an imaging plane (or an image sensor). In example embodiments, units of a radius of curvature, a thickness, a TTL (a distance from an object side of the first lens to the imaging plane), ImgHT (a height of the imaging plane), a focal length, and an effective radius of a lens are indicated in millimeters (mm).

A thickness of a lens, a gap between lenses, and a TTL refer to a distance of a lens on an optical axis. Also, in the descriptions of a shape of a lens, the configuration in which one surface is convex indicates that a paraxial region of the surface is convex, and the configuration in which one surface is concave indicates that a paraxial region of the surface is concave. Thus, even when it is described that one surface of a lens is convex, an edge of the lens may be concave. Similarly, even when it is described that one surface of a lens is concave, an edge of the lens may be convex.

An optical imaging system described herein may be configured to be mounted in a portable electronic device. For example, the optical imaging system may be mounted in a smartphone, a laptop computer, an augmented reality (AR) device, a virtual reality (VR) device, a portable game machine, glasses, an iris recognition device, or the like. However, the range and examples of use of the optical imaging system described herein are not limited to the above-described electronic devices. For example, the optical imaging system may be applied to an electronic device providing a narrow mounting space but requiring high-resolution image capturing.

An optical imaging system according to an example may include a plurality of lenses. For example, the optical imaging system may include a first lens, a second lens, and a third lens disposed in order from an object side. The optical imaging system may be configured to achieve miniaturization and weight reduction. For example, in the optical imaging system, a distance TTL from an object side to an imaging plane of the first lens may be less than 2.0 mm. The optical imaging system may be configured such that the distance TTL is greater than a predetermined value to achieve high resolution. For example, the optical imaging system may be configured such that the distance TTL is greater than 1.2 mm. The optical imaging system may satisfy a distinctive conditional expression regarding a focal length "f" of the optical imaging system and a focal length "f3" of the third lens. For example, the optical imaging system may satisfy the following conditional expression: 0<f3/f<1.0.

An optical imaging system according to an example may include a first lens, a second lens, and a third lens disposed in order from an object side. The optical imaging system may include a lens having predetermined refractive power. For example, the optical imaging system may include a second lens having negative refractive power. The optical imaging system may satisfy a distinctive conditional expression regarding a focal length "f" of the optical imaging system and a distance "TTL" from an object side to an imaging plane of the first lens. For example, the optical imaging system may satisfy the following conditional expression: 1.4<TTL/f<1.8.

The optical imaging system described herein may satisfy one or more of the following conditional expressions. For example, the optical imaging systems according to the various examples may satisfy one or more of the following conditional expressions.

$0 < f1/f < 1.5$ $-1.0 < f2/f < 0$ $0 < f/f3 < 1.0$ $|f1/f2| < 3.0$ $-2.0 < f2/f3 < 0$ $0.25 < BFL/TTL < 0.5$ $Bfin/f < 0.35$ $TTL/f < 1.8$ $D12/f < 0.25$ $1 \leq V1 - V3 < 40$ $1 \leq V1 - V2 < 40$ In the above conditional expressions, "f" is a focal length of the optical imaging system, "f1" is a focal length of the first lens, "f2" is a focal length of the second lens, "f3" is a focal length of the third lens, "TTL" is a distance from the object-side surface the first lens to the imaging plane, "BFL" is a distance from an image-side surface of the third lens to the imaging plane, "Bfin" is a back focal length of the optical imaging system when an image of an object disposed at infinity is imaged, "D12" is a distance from an image-side surface of the first lens to an object-side surface the second lens, V1 is an Abbe number of the first lens, V2 is an Abbe number of the second lens, and V3 is an Abbe number of the third lens.

The optical imaging system may satisfy some of the above-described conditional expressions in a more limited form, as follows.

$0.8 < f1/f < 1.2$ $-0.8 < f2/f < -0.3$ $0.4 < f3/f < 0.8$ $-1.2 < f2/f3 < -0.8$ $1.4 < TTL/f < 1.8$ $0.12 < D12/f < 0.24$

The optical imaging system according to an example may satisfy one or more of the following conditional expressions. For example, the optical imaging system may satisfy one or more of the following conditional expressions while satisfying one or more of the above-described conditional expressions.

$1.0 < f1/f3 < 2.6$ $4.0 < D12/D23 < 6.0$ $0 < (R1+R2)/(R1-R2) < 0.4$ $-5.0 < (R5+R6)/(R5-R6) < -1.0$ $0.1 < (R1+R2)/T1 < 2.4$ $2.0 < (R5+R6)/T3 < 3.6$

In the above conditional expressions, "D23" is a distance from an image-side surface of the second lens to an object-side surface of the third lens, "R1" is a radius of curvature of an object-side surface of the first lens, "R2" is a radius of curvature of an image-side surface of the first lens, "R5" is a radius of curvature of an object-side surface the third lens, "R6" is a radius of curvature of an image-side surface of the third lens, "T1" is a thickness of the first lens, and "T3" is a thickness of the third lens.

The optical imaging systems according to the various examples may include lenses having distinctive characteristics. For example, the optical imaging systems may include a distinctive lens having a high refractive index and a high Abbe number. As a detailed example, the optical imaging system may include one or more distinctive lenses, having a refractive index of 1.6 or more, and an Abbe number of 50 or more. The distinctive lens may be configured to block a specific wavelength of light. For example, a distinctive lens may be configured to block visible light. As a detailed example, the distinctive lens may be configured to transmit only light having a wavelength of 780 nm. Since the optical imaging system including the distinctive lens may omit the configuration of a filter, it may be advantageous for miniaturization and weight reduction of a camera module. The distinctive lens may have an opaque color. For example, the distinctive lens may have a black color. However, the color of the characteristic lens is not limited to the black color.

The optical imaging system described herein may include one or more lenses the following characteristics, as necessary. As an example, the optical imaging system may include one of the first to third lenses having the following features. As another example, the optical imaging system may include two or more lenses, among the first to third lenses having the following features. However, the optical imaging system according to the above-described examples does not necessarily include the lens having the following features. Hereinafter, features of the first to third lenses will be described.

The first lens may have refractive power. For example, the first lens may have positive refractive power. The first lens may have one convex surface. For example, the first lens may have a convex image-side surface. The first lens may have a spherical surface or an aspherical surface. As an example, both surfaces of the first lens may be aspherical. The first lens may be formed of a material having high light transmissivity and improved workability. For example, the first lens may be formed of a plastic material or a glass material. The first lens may be configured to have a predetermined refractive index. As an example, the refractive index of the first lens may be greater than 1.5. As a detailed example, the refractive index of the first lens may be greater than 1.5 to less than 1.7. The first lens may have a predetermined Abbe number. As an example, the Abbe number of the first lens may be 40 or more. As a detailed example, the Abbe number of the first lens may be greater than 50 to less than 60.

The second lens may have refractive power. For example, the second lens may have negative refractive power. The second lens may have one concave surface. As an example, the second lens may have a concave object-side surface. As another example, the second lens may have a concave image-side surface. The second lens includes a spherical surface or an aspherical surface. For example, both surfaces of the second lens may be aspherical. The second lens may be formed of a material having high light transmissivity and excellent workability. For example, the second lens may be formed of a plastic material or a glass material. The second lens may be configured to have a predetermined refractive index. As an example, the refractive index of the first lens may be greater than 1.6. The second lens may have a predetermined Abbe number. For example, the Abbe number of the second lens may be 20 or more. As a detailed example, the Abbe number of the second lens may be greater than 20 to less than 60.

The third lens has refractive power. For example, the third lens may have positive refractive power. The third lens may have a spherical surface or an aspherical surface. As an example, both surfaces of the third lens may be aspherical. The third lens may have an inflection point. For example, the inflection point may be formed on at least one of an object-side surface and an image-side surface of the third lens. The third lens may be formed of a material having high light transmissivity and improved workability. For example, the third lens may be formed of a plastic material or a glass material. The third lens may be configured to have a predetermined refractive index. For example, the refractive index of the third lens may be greater than 1.6. As a detailed example, the refractive index of the third lens may be greater than 1.6 to less than 1.7. The third lens may have a predetermined Abbe number. For example, the Abbe number of the third lens may be 20 or more. As a detailed example, the Abbe number of the third lens may be greater than 20 to less than 60.

A plurality of lenses may be formed of a material having a refractive index different from that of air. For example, the plurality of lenses may be formed of a plastic material or a glass material. At least one of the plurality of lenses may have an aspherical surface. The aspherical surface of the lens may be represented by the following Equation 1.

$$z = \frac{cr^2}{1+\sqrt{1-(1+k)c^2r^2}} + Ar^4 + Br^6 + Cr^8 + Dr^{10} + Er^{12} + Fr^{14} + Gr^{16} + Hr^{18} + Jr^{20} \quad \text{Equation 1}$$

In Equation 1, "c" is an inverse of a radius of a curvature of a respective lens, "k" is a conic constant, "r" is a distance from a certain point on an aspherical surface of the lens to an optical axis, "A to J" are aspheric constants, and "Z" (or "SAG") is a height from a certain point on an aspherical surface of the lens to an apex of the aspherical surface in an optical axis direction.

The optical imaging system described herein may include a filter and a stop.

The filter may be disposed between the third lens and the imaging plane. However, the position of the filter is not limited to a position between the third lens and the imaging plane. The filter may be configured to block some wavelengths of light. For example, the filter may be configured to block infrared rays. The stop may be disposed on the object-side surface of the first lens or between one lens and another lens. The stop may be omitted, as necessary.

Next, detailed examples of an optical imaging system will be described with reference to accompanying drawings.

An optical imaging system according to a first example will be described with reference to FIG. 1.

An optical imaging system 100 may include a first lens 110, a second lens 120, and a third lens 130 disposed in order from the object side. The first lens 110 may have positive refractive power, and may have a convex object-side surface and a convex image-side surface. The second lens 120 may have negative refractive power, and may have a concave object-side surface and a concave image-side surface. The third lens 130 may have positive refractive power, and may have a convex object-side surface and a concave image-side surface. An inflection point may be formed on the object-side surface and the image-side surface the third lens 130.

The optical imaging system 100 may further include a filter IF. The filter IF may be disposed between the third lens 130 and an imaging plane IP. The imaging plane IP may be formed on a surface of the image sensor IS or inside the image sensor IS.

Figure 2:
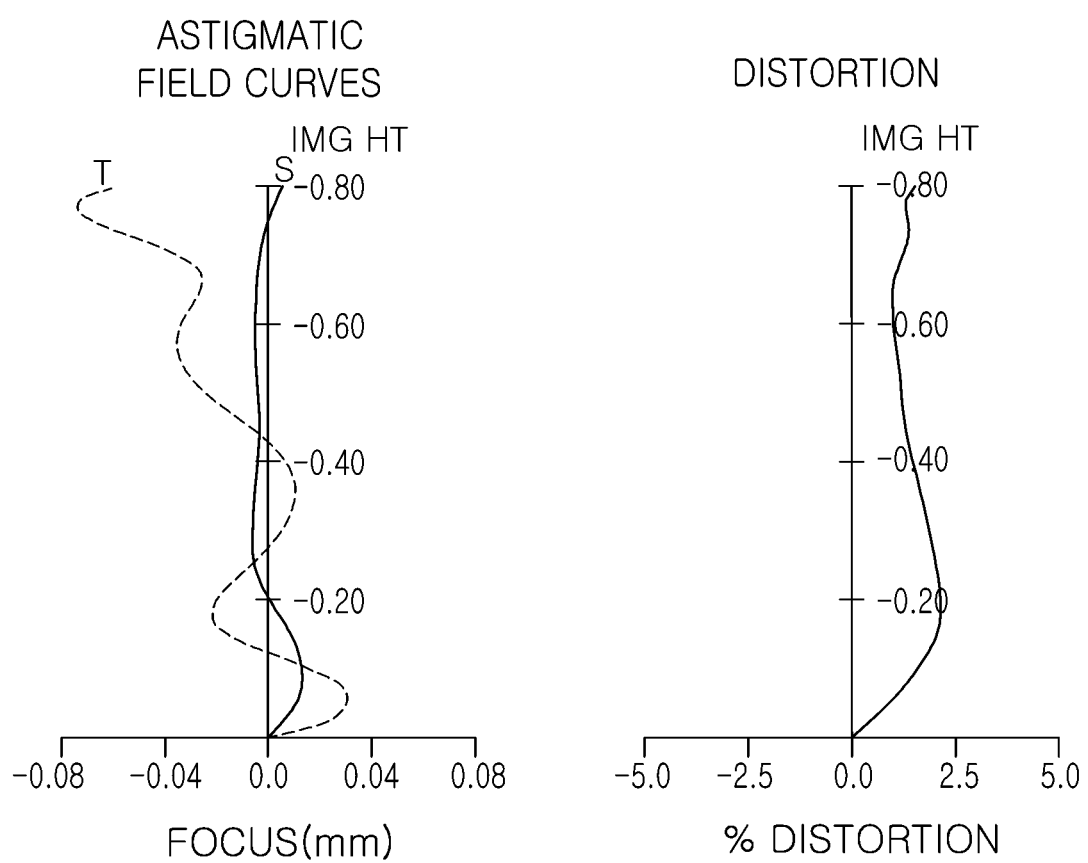
FIG. 2 illustrates an aberration curve of the optical imaging system illustrated in FIG. 1.

Tables 1 and 2 illustrate lens characteristics and aspherical values of the optical imaging system 100, and FIG. 2 illustrates an aberration curve of the optical imaging system 100.

TABLE 1

| Surface No. | Configuration | Radius of Curvature | Thickness/ Distance | Refractive Index | Abbe Number |
|---|---|---|---|---|---|
| S1 | First Lens | 1.1311 | 0.2230 | 1.540 | 56.0 |
| S2 | | −0.6271 | 0.1274 | | |
| S3 | Second Lens | −0.3044 | 0.1937 | 1.652 | 20.4 |
| S4 | | 0.6536 | 0.0300 | | |
| S5 | Third Lens | 0.1752 | 0.2000 | 1.652 | 20.4 |
| S6 | | 0.5356 | 0.1468 | | |
| S7 | Filter | Infinity | 0.4000 | 1.517 | 64.2 |
| S8 | | Infinity | 0.1141 | | |
| S9 | Imaging Plane | Infinity | 0.0000 | | |

TABLE 2

| | Surface No. | | | | | |
|---|---|---|---|---|---|---|
| | S1 | S2 | S3 | S4 | S5 | S6 |
| K | −1.0997.E+01 | −9.9000.E+01 | −2.6318.E+00 | −1.5649.E+00 | −7.4625.E+00 | −3.3630.E+00 |
| A | 1.7442.E+01 | −4.9606.E+01 | −1.6198.E+01 | −1.5748.E+02 | 5.6627.E+00 | 5.7450.E+00 |
| B | −6.5138.E+03 | 3.3869.E+03 | 8.9504.E+02 | 1.3311.E+04 | −3.7073.E+02 | −2.9206.E+02 |
| C | 1.2159.E+06 | −2.0813.E+05 | −9.1728.E+04 | −9.9537.E+05 | 8.7618.E+03 | 5.4130.E+03 |
| D | −1.4362.E+08 | 8.8215.E+06 | 6.8421.E+06 | 5.6577.E+07 | −1.2865.E+05 | −6.2022.E+04 |
| E | 1.1345.E+10 | −2.5140.E+08 | −3.5218.E+08 | −2.3614.E+09 | 1.2457.E+06 | 4.7365.E+05 |
| F | −6.2286.E+11 | 4.8135.E+09 | 1.2728.E+10 | 7.2296.E+10 | −8.1405.E+06 | −2.4861.E+06 |
| G | 2.4325.E+13 | −6.2593.E+10 | −3.2250.E+11 | −1.6300.E+12 | 3.6356.E+07 | 9.1183.E+06 |
| H | −6.8361.E+14 | 5.6232.E+11 | 5.7342.E+12 | 2.7096.E+13 | −1.1231.E+08 | −2.3587.E+07 |
| J | 1.3841.E+16 | −3.5294.E+12 | −7.1679.E+13 | −3.3036.E+14 | 2.4168.E+08 | 4.3116.E+07 |

Figure 3:
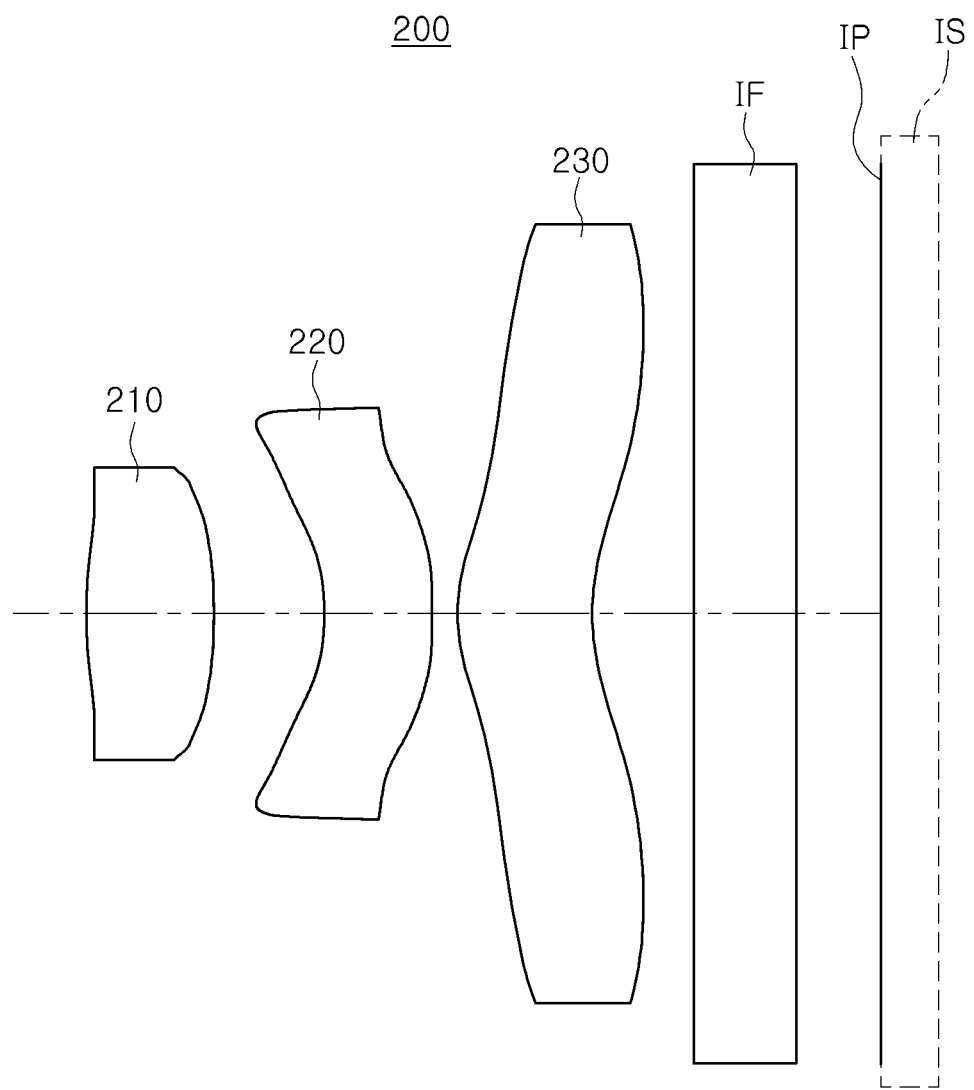
FIG. 3 illustrates a configuration of an optical imaging system according to a second example.

An optical imaging system according to a second example will be described with reference to FIG. 3.

An optical imaging system 200 may include a first lens 210, a second lens 220, and a third lens 230 disposed in order from the object side. The first lens 210 may have positive refractive power, and may have a convex object-side surface and a convex image-side surface. The second lens 220 may have negative refractive power, and may have a concave object-side surface and a convex image-side surface. The third lens 230 may have positive refractive power, and may have a convex object-side surface and a concave image-side surface. Inflection points may be formed on the object-side surface and the image-side surface of the third lens 230.

The optical imaging system 200 further includes a filter IF. The filter IF may be disposed between the third lens 230 and the imaging plane IP. The imaging plane IP may be formed on a surface of the image sensor IS or inside the image sensor IS.

Figure 4:
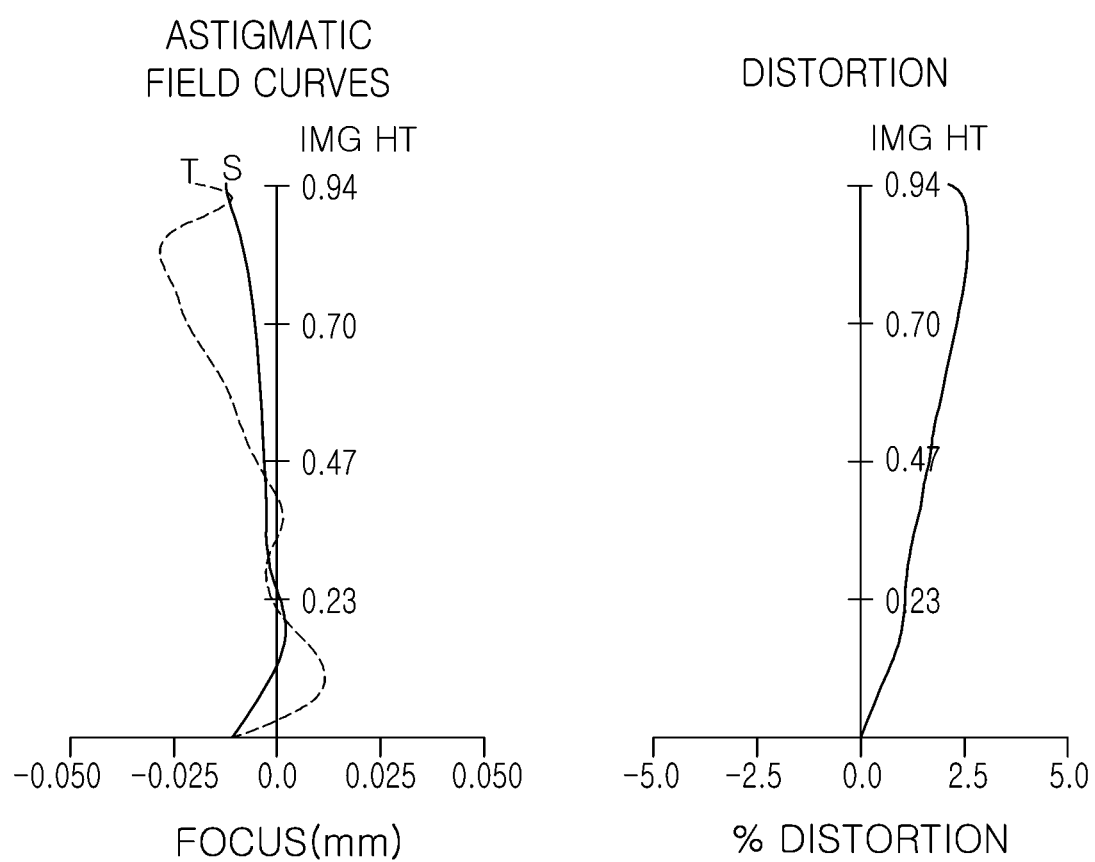
FIG. 4 illustrates an aberration curve of the optical imaging system illustrated in FIG. 3.

Tables 3 and 4 illustrate lens characteristics and aspheric values of the optical imaging system 200, and FIG. 4 illustrates an aberration curve of the optical imaging system 200.

Figure 5:
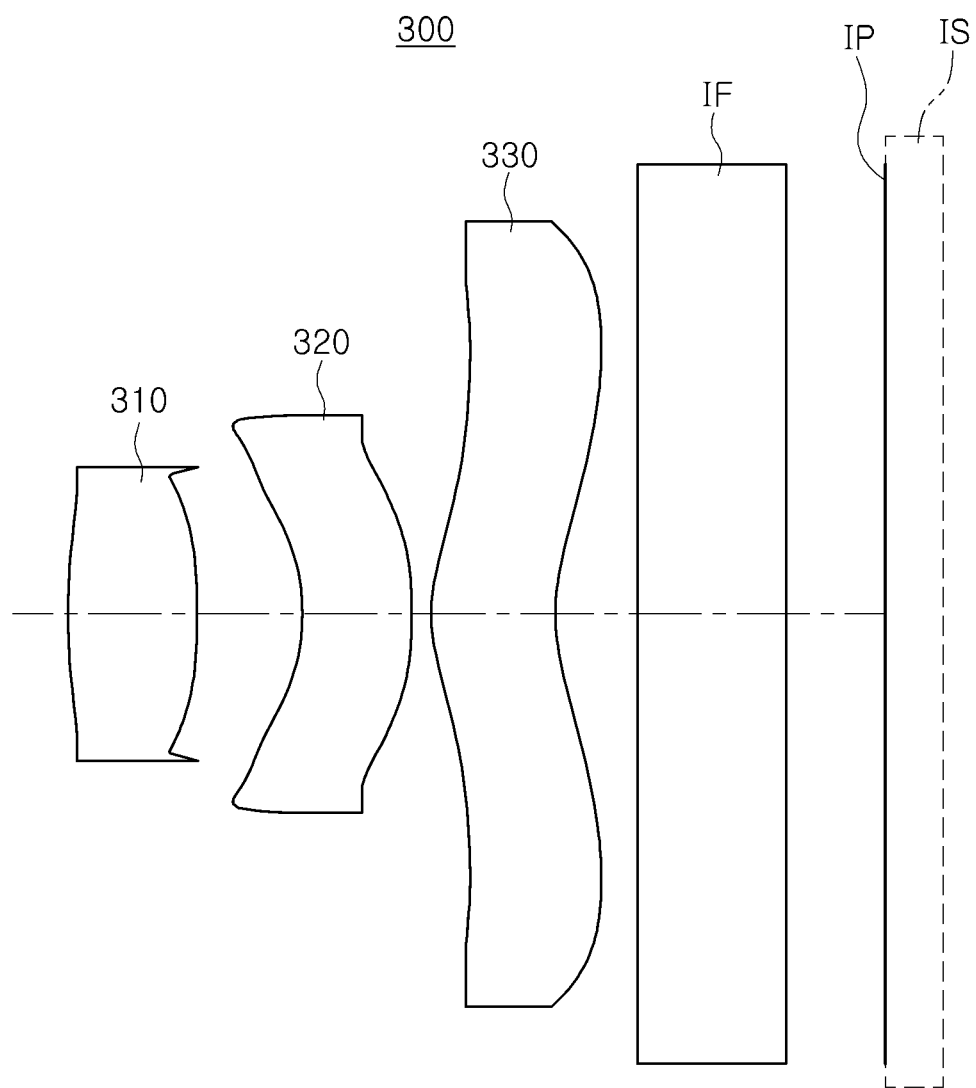
FIG. 5 illustrates a configuration of an optical imaging system according to a third example.

An optical imaging system according to a third example will be described with reference to FIG. 5.

An optical imaging system 300 may include a first lens 310, a second lens 320, and a third lens 330 disposed in order from the object side. The first lens 310 may have positive refractive power, and may have a convex object-side surface and a convex image-side surface. The second lens 320 may have negative refractive power, and may have a concave object-side surface and a convex image-side surface. The third lens 330 may have positive refractive power, and may have a convex object-side surface and a concave image-side surface. Inflection points may be formed on the object-side surface and the image-side surface of the third lens 330.

The optical imaging system 300 further includes a filter IF. The filter IF may be disposed between the third lens 330 and an imaging plane IP. The imaging plane IP may be formed on the surface of the image sensor IS or inside the image sensor IS.

Figure 6:
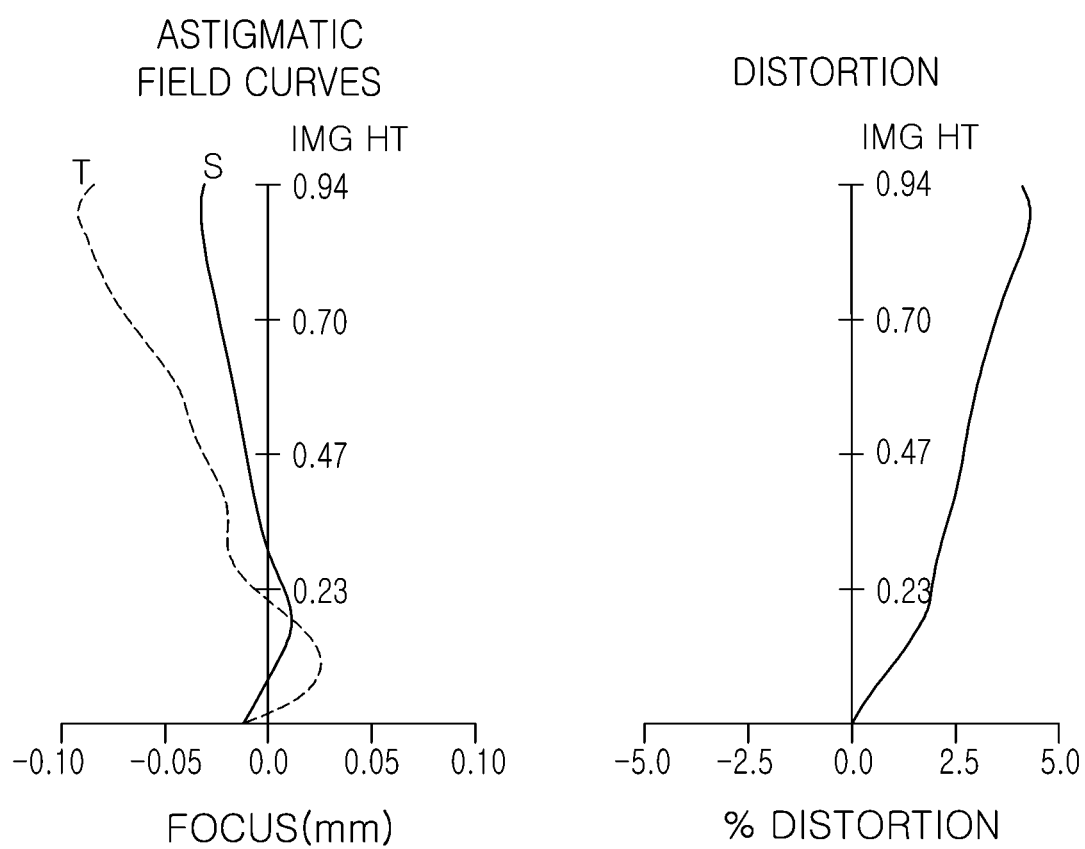
FIG. 6 illustrates an aberration curve of the optical imaging system illustrated in FIG. 5.

Tables 5 and 6 illustrate lens characteristics and aspherical values of the optical imaging system 300, and FIG. 6 illustrates an aberration curve of the optical imaging system 300.

TABLE 3

| Surface No. | Configuration | Radius of Curvature | Thickness/ Distance | Refractive Index | Abbe Number |
|---|---|---|---|---|---|
| S1 | First Lens | 1.1466 | 0.2601 | 1.540 | 56.0 |
| S2 | | −1.0033 | 0.2266 | | |
| S3 | Second Lens | −0.3750 | 0.2200 | 1.652 | 20.4 |
| S4 | | −2.2027 | 0.0510 | | |
| S5 | Third Lens | 0.2864 | 0.2769 | 1.652 | 20.4 |
| S6 | | 0.4636 | 0.2036 | | |
| S7 | Filter | Infinity | 0.2100 | 1.517 | 64.2 |
| S8 | | Infinity | 0.1630 | | |
| S9 | Imaging Plane | Infinity | 0.0110 | | |

TABLE 5

| Surface No. | Configuration | Radius of Curvature | Thickness/ Distance | Refractive Index | Abbe Number |
|---|---|---|---|---|---|
| S1 | First Lens | 1.1468 | 0.2604 | 1.540 | 56.0 |
| S2 | | −0.9711 | 0.2122 | | |
| S3 | Second Lens | −0.3756 | 0.2200 | 1.652 | 20.4 |
| S4 | | −2.4727 | 0.0404 | | |
| S5 | Third Lens | 0.2858 | 0.2515 | 1.652 | 20.4 |
| S6 | | 0.4793 | 0.1656 | | |
| S7 | Filter | Infinity | 0.0000 | 1.517 | 64.2 |
| S8 | | Infinity | 0.3864 | | |
| S9 | Imaging Plane | Infinity | 0.0120 | | |

TABLE 4

| | Surface No. | | | | | |
|---|---|---|---|---|---|---|
| | S1 | S2 | S3 | S4 | S5 | S6 |
| K | −4.8741.E+01 | 1.0424.E+01 | −1.8027.E+00 | 2.8054.E+01 | −7.7495.E+00 | −7.3497.E−01 |
| A | 2.5534.E+00 | −6.8969.E−01 | −1.9304.E+00 | −3.6925.E+00 | −2.7789.E+00 | −6.1870.E+00 |
| B | −1.7897.E+02 | −6.9954.E+01 | −9.1742.E+01 | 1.2966.E+03 | 1.5720.E+01 | 2.3953.E+01 |
| C | 1.2953.E+04 | 4.8375.E+03 | 1.0278.E+04 | −4.1123.E+04 | −6.7124.E+01 | −7.0968.E+01 |
| D | −7.9119.E+05 | −1.7504.E+05 | −5.7465.E+05 | 1.1332.E+06 | 2.3050.E+02 | 1.4596.E+02 |
| E | 3.2615.E+07 | 3.9314.E+06 | 2.0325.E+07 | −2.5638.E+07 | −5.4490.E+02 | −7.2615.E+02 |
| F | −9.2252.E+08 | −5.3993.E+07 | −4.5266.E+08 | 4.5995.E+08 | 8.1151.E+02 | 5.9900.E+03 |
| G | 1.8258.E+10 | 4.6305.E+08 | 6.2089.E+09 | −6.3559.E+09 | −7.0276.E+02 | −3.0374.E+04 |
| H | −2.5526.E+11 | −2.5114.E+09 | −4.1491.E+10 | 6.6175.E+10 | 2.5459.E+02 | 9.4403.E+04 |
| J | 2.5190.E+12 | 8.3847.E+09 | −1.6475.E+11 | −5.0877.E+11 | 1.2264.E+02 | −1.9024.E+05 |

TABLE 6

| | Surface No. | | | | | |
|---|---|---|---|---|---|---|
| | S1 | S2 | S3 | S4 | S5 | S6 |
| K | −4.9459.E+01 | 9.8944.E+00 | −1.8177.E+00 | 3.4270.E+01 | −9.2426.E+00 | −7.5251.E−01 |
| A | 5.3081.E+00 | −1.3525.E+00 | −4.1835.E+00 | −4.0138.E+01 | −2.5093.E+00 | −5.6981.E+00 |
| B | −5.7496.E+02 | 1.2181.E+01 | 5.7142.E+02 | 1.4479.E+03 | 5.6131.E+00 | 1.1929.E+01 |
| C | 4.7656.E+04 | −9.3366.E+02 | −6.5870.E+04 | −4.3263.E+04 | 4.0537.E+01 | 8.1495.E+01 |
| D | −2.7391.E+06 | 6.8822.E+04 | 4.6525.E+06 | 1.0502.E+06 | −3.8702.E+02 | −1.0660.E+03 |
| E | 1.0560.E+08 | −2.6568.E+06 | −2.1713.E+08 | −2.0407.E+07 | 1.6950.E+03 | 5.9094.E+03 |
| F | −2.8096.E+09 | 6.4790.E+07 | 7.0326.E+09 | 3.1827.E+08 | −4.8802.E+03 | −1.9795.E+04 |
| G | 5.2656.E+10 | −1.0018.E+09 | −1.6167.E+11 | −3.9402.E+09 | 9.8165.E+03 | 4.1769.E+04 |
| H | −7.0236.E+11 | 1.0020.E+10 | 2.6687.E+12 | 3.7926.E+10 | −1.3868.E+04 | −5.1921.E+04 |
| J | 6.6679.E+12 | −6.6377.E+10 | −3.1692.E+13 | −2.7633.E+11 | 1.3703.E+04 | 2.4402.E+04 |

Figure 7:
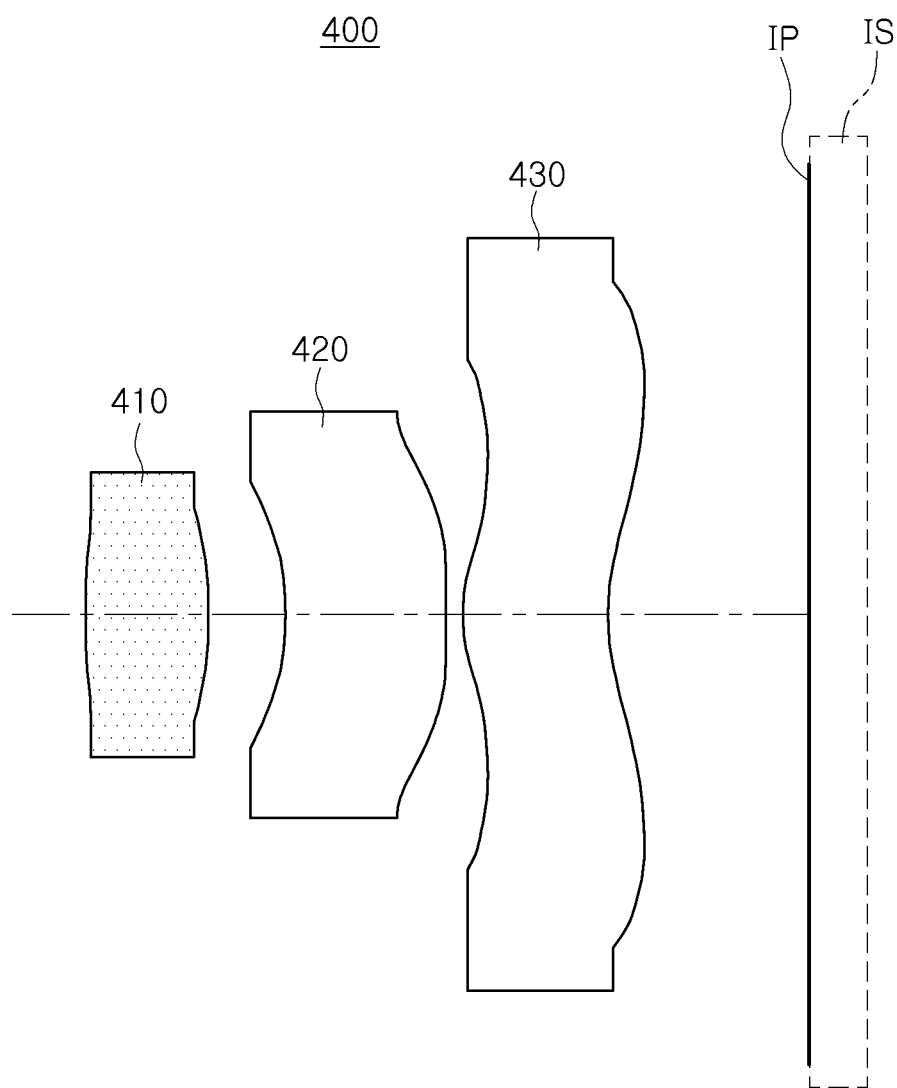
FIG. 7 illustrates a configuration of an optical imaging system according to a fourth example.

An optical imaging system according to a fourth example will be described with reference to FIG. 7.

An optical imaging system 400 may include a first lens 410, a second lens 420, and a third lens 430 disposed in order from the object side. The first lens 410 may have positive refractive power, and may have a convex object-side surface and a convex image-side surface. The second lens 420 may have negative refractive power, and may have a concave object-side surface and a concave image-side surface. The third lens 430 may have positive refractive power, and may have a convex object-side surface and a concave image-side surface. Inflection points may be formed on the object-side surface and the image-side surface of the third lens 430. The imaging plane IP may be formed on a surface of an image sensor IS or inside the image sensor IS.

In the optical imaging system 400, the first lens 410 may be configured to have distinctive characteristics. For example, the first lens 410 may be formed of a material having a high refractive index and a high Abbe number. As a detailed example, the first lens 410 may be formed of a material having a refractive index of 1.6 or more and an Abbe number of 50 or more. The optical imaging system 400 may include a lens configured to block a specific wavelength of light. For example, in the optical imaging system 400, the first lens 410 may be configured to block visible light and to transmit only light having an infrared wavelength. Accordingly, in the optical imaging system 400, a filter configuration may be omitted to achieve miniaturization and weight reduction of a camera module.

Figure 8:
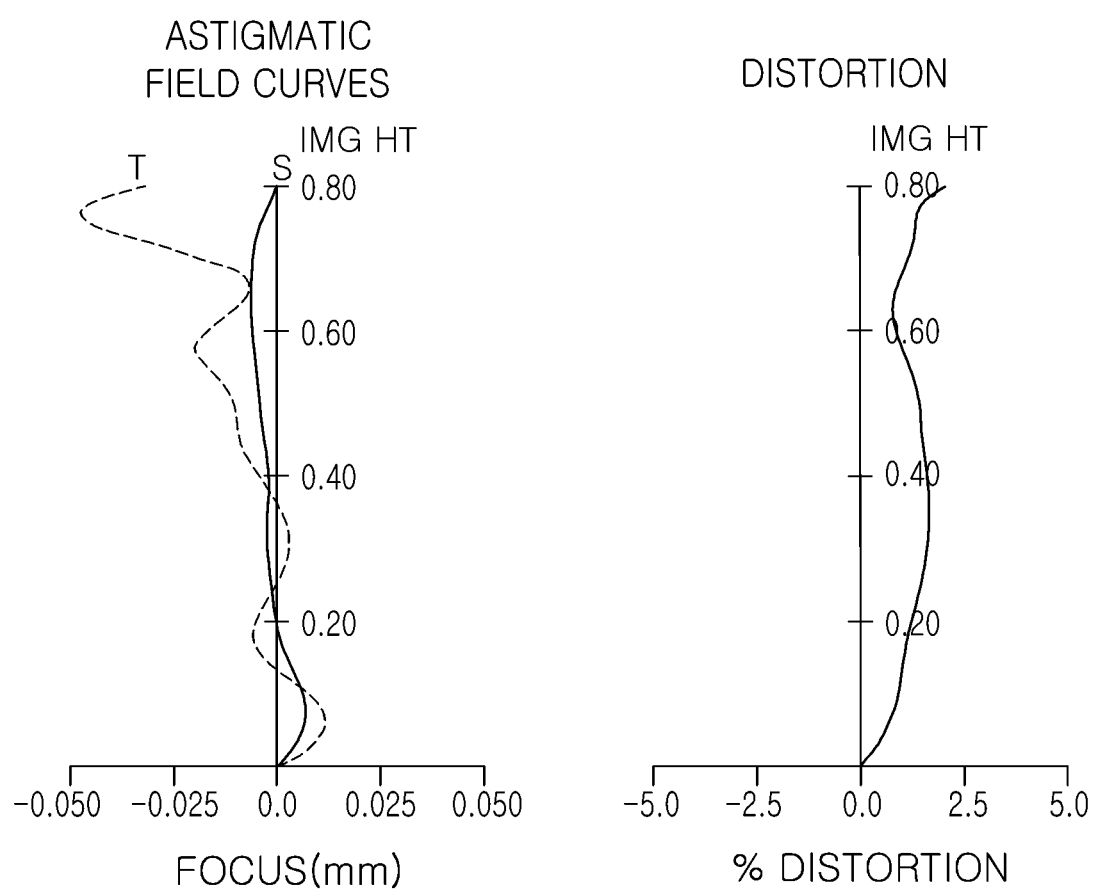
FIG. 8 illustrates an aberration curve of the optical imaging system illustrated in FIG. 7.

Tables 7 and 8 illustrate lens characteristics and aspherical values of the optical imaging system 400, and FIG. 8 illustrates an aberration curve of the optical imaging system 400.

TABLE 7

| Surface No. | Configuration | Radius of Curvature | Thickness/ Distance | Refractive Index | Abbe Number |
|---|---|---|---|---|---|
| S1 | First Lens | 1.1249 | 0.2321 | 1.642 | 55.0 |
| S2 | | −0.7859 | 0.1464 | | |
| S3 | Second Lens | −0.4153 | 0.3027 | 1.652 | 20.4 |
| S4 | | 0.8532 | 0.0325 | | |
| S5 | Third Lens | 0.2141 | 0.2759 | 1.652 | 20.4 |
| S6 | | 0.4336 | 0.1424 | | |
| S7 | | Infinity | 0.0000 | | |
| S8 | | Infinity | 0.2386 | | |
| S9 | Imaging Plane | Infinity | 0.0000 | | |

TABLE 8

| | Surface No. | | | | | |
|---|---|---|---|---|---|---|
| | S1 | S2 | S3 | S4 | S5 | S6 |
| K | 1.0296.E+00 | −9.9000.E+01 | −3.1857.E+00 | 9.5578.E−01 | −8.7782.E+00 | −3.0651.E+00 |
| A | 5.2569.E−02 | −2.8265.E+01 | −6.2608.E+00 | −1.1075.E+02 | −4.2406.E+00 | −2.9498.E+00 |
| B | −1.1253.E+03 | 1.4732.E+03 | −1.0053.E+01 | 7.8496.E+03 | −1.2151.E+02 | −4.6495.E+01 |
| C | 2.2906.E+05 | −8.2416.E+04 | 3.8504.E+03 | −5.1230.E+05 | 3.4492.E+03 | 9.5899.E+02 |
| D | −2.9224.E+07 | 3.3762.E+06 | −2.6215.E+05 | 2.5718.E+07 | −4.4983.E+04 | −8.7502.E+03 |
| E | 2.4324.E+09 | −9.4783.E+07 | 1.5634.E+07 | −9.4851.E+08 | 3.6175.E+05 | 4.8420.E+04 |
| F | −1.3788.E+11 | 1.7840.E+09 | −6.1841.E+08 | 2.5630.E+10 | −1.9229.E+06 | −1.7683.E+05 |
| G | 5.4699.E+12 | −2.2543.E+10 | 1.6996.E+10 | −5.0977.E+11 | 6.9438.E+06 | 4.4265.E+05 |
| H | −1.5424.E+14 | 1.9476.E+11 | −3.3199.E+11 | 7.4783.E+12 | −1.7328.E+07 | −7.7512.E+05 |
| J | 3.1048.E+15 | −1.1667.E+12 | 4.5357.E+12 | −8.0560.E+13 | 3.0135.E+07 | 9.5660.E+05 |

Figure 9:
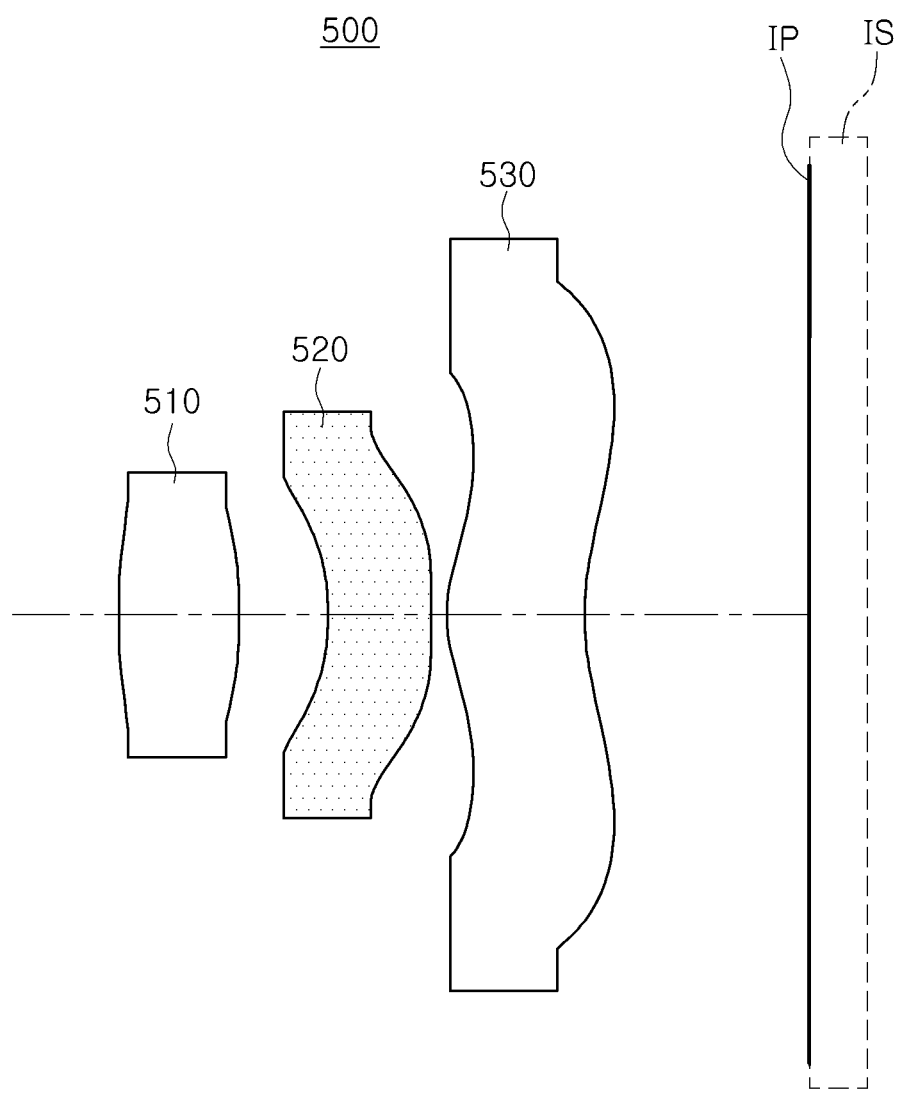
FIG. 9 illustrates a configuration of an optical imaging system according to a fifth example.

An optical imaging system according to a fifth example will be described with reference to FIG. 9.

An optical imaging system 500 may include a first lens 510, a second lens 520, and a third lens 530 disposed in order from the object side. The first lens 510 may have positive refractive power, and may have a convex object-side surface and a convex image-side surface. The second lens 520 may have negative refractive power, and may have a concave object-side surface and a concave image-side surface. The third lens 530 may have positive refractive power, and may have a convex object-side surface and a concave image-side surface. Inflection points may be formed on the object side and the image-side surface the third lens 530. An imaging plane IP may be formed on a surface of an image sensor IS or inside the image sensor IS.

In the optical imaging system 500, the second lens 520 may be configured to have distinctive characteristics. For example, the second lens 520 may be formed of a material having a high refractive index and a high Abbe number. As a detailed example, the second lens 520 may be formed of a material having a refractive index of 1.6 or more and an Abbe number of 50 or more. The optical imaging system 500 may include a lens configured to block a specific wavelength of light. For example, in the optical imaging system 500, the second lens 520 may be configured to block visible light and to transmit only light having an infrared wavelength. Accordingly, in the optical imaging system 500, a filter configuration may be omitted to achieve miniaturization and weight reduction of a camera module.

Figure 10:
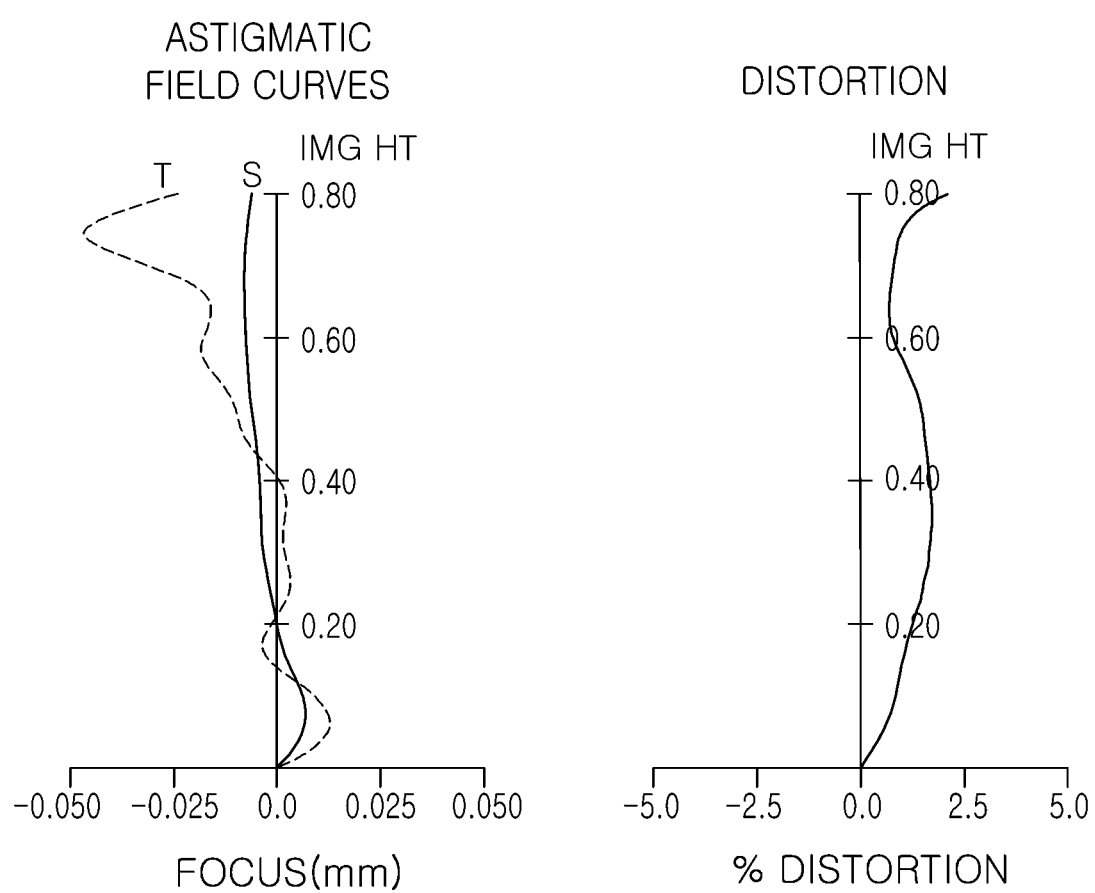
FIG. 10 illustrates an aberration curve of the optical imaging system illustrated in FIG. 9.

Tables 9 and 10 illustrate lens characteristics and aspherical values of the optical imaging system 500, and FIG. 10 illustrates an aberration curve of the optical imaging system 500.

TABLE 9

| Surface No. | Configuration | Radius of Curvature | Thickness/ Distance | Refractive Index | Abbe Number |
|---|---|---|---|---|---|
| S1 | First Lens | 0.9262 | 0.2258 | 1.540 | 56.0 |
| S2 |  | −0.8829 | 0.1683 |  |  |
| S3 | Second Lens | −0.3521 | 0.1927 | 1.642 | 55.0 |
| S4 |  | 1.0416 | 0.0308 |  |  |
| S5 | Third Lens | 0.2003 | 0.2603 | 1.652 | 20.4 |
| S6 |  | 0.4984 | 0.1303 |  |  |
| S7 |  | Infinity | 0.2169 |  |  |
| S8 |  | Infinity | 0.0750 |  |  |
| S9 | Imaging Plane | Infinity | 0.0000 |  |  |

TABLE 10

| | Surface No. | | | | | |
|---|---|---|---|---|---|---|
| | S1 | S2 | S3 | S4 | S5 | S6 |
| K | 2.6336.E+00 | −9.9000.E+01 | 2.8030.E+00 | 1.8606.E+00 | −8.6641.E+00 | −3.6979.E+00 |
| A | 3.8478.E−01 | −2.1501.E+01 | −1.1151.E+01 | −1.3709.E+02 | −3.6144.E+00 | −2.9220.E−01 |
| B | −1.0301.E+03 | 9.3047.E+02 | 5.1514.E+02 | 1.1015.E+04 | −1.2892.E+02 | −1.1838.E+02 |
| C | 1.6618.E+05 | −4.9490.E+04 | −5.0340.E+04 | −8.1214.E+05 | 3.7710.E+03 | 2.1145.E+03 |
| D | −1.7448.E+07 | 1.9884.E+06 | 2.9611.E+06 | 4.5690.E+07 | −5.4607.E+04 | −2.0801.E+04 |
| E | 1.2497.E+09 | −5.4713.E+07 | −1.0507.E+08 | −1.8785.E+09 | 4.9647.E+05 | 1.3097.E+05 |
| F | −6.3618.E+10 | 9.9975.E+08 | 2.2891.E+09 | 5.6316.E+10 | −2.9979.E+06 | −5.5704.E+05 |
| G | 2.3508.E+12 | −1.2144.E+10 | −2.5637.E+10 | −1.2373.E+12 | 1.2266.E+07 | 1.6441.E+06 |
| H | −6.3541.E+13 | 1.0019.E+11 | −3.1159.E+10 | 1.9974.E+13 | −3.4510.E+07 | −3.4172.E+06 |
| J | 1.2525.E+15 | −5.7083.E+11 | 5.4827.E+12 | −2.3601.E+14 | 6.7358.E+07 | 5.0242.E+06 |

Figure 11:
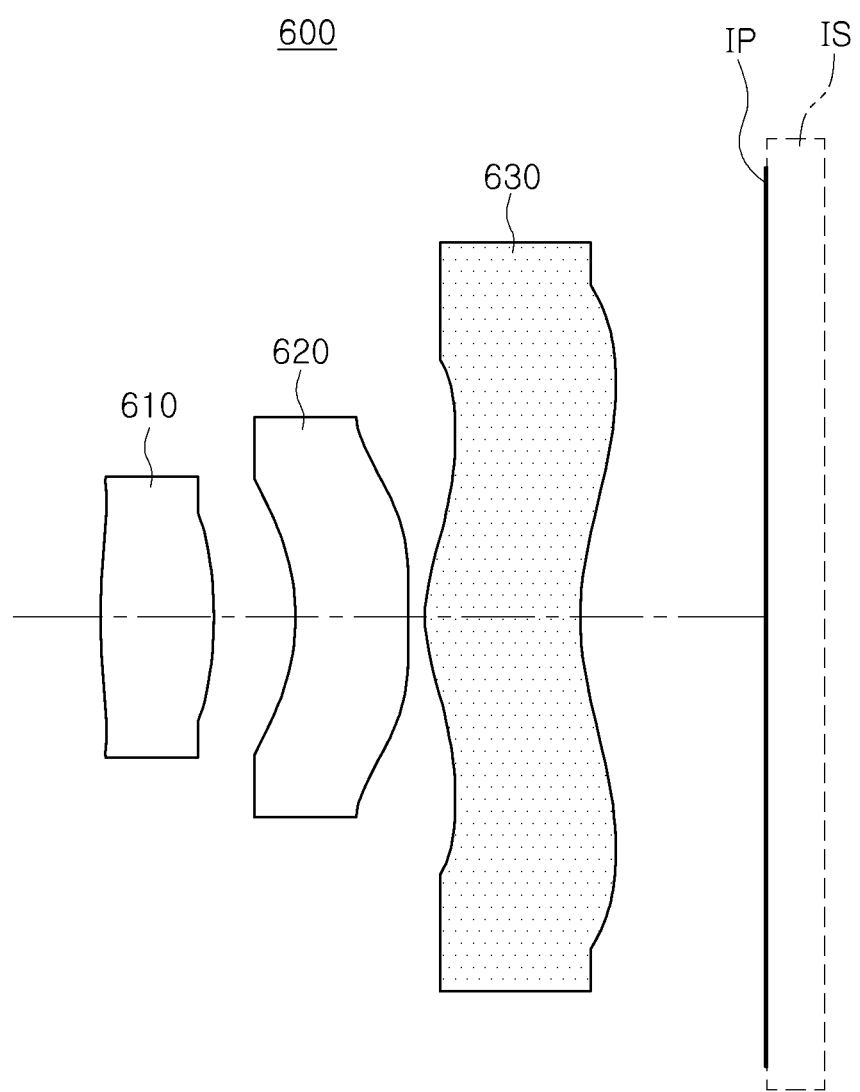
FIG. 11 illustrates a configuration of an optical imaging system according to a sixth example.

An optical imaging system according to a sixth example will be described with reference to FIG. 11.

An optical imaging system 600 may include a first lens 610, a second lens 620, and a third lens 630 disposed in order from the object side. The first lens 610 may have positive refractive power, and may have a convex object-side surface and a convex image-side surface. The second lens 620 may have negative refractive power, and may have a concave object-side surface and a concave image-side surface. The third lens 630 may have positive refractive power, and may have a convex object-side surface and a concave image-side surface. Inflection points may be formed on the object-side surface and the image-side surface of the third lens 630. The imaging plane IP may be formed on a surface of an image sensor IS or inside the image sensor IS.

In the optical imaging system 600, the third lens 630 may be configured to have distinctive characteristics. For example, the third lens 630 may be formed of a material having a high refractive index and a high Abbe number. As a specific example, the third lens 630 may be formed of a material having a refractive index of 1.6 or more and an Abbe number of 50 or more. The optical imaging system 600 may include a lens configured to block a specific wavelength of light. For example, in the optical imaging system 600, the third lens 630 may be configured to block visible light and to transmit only light having an infrared wavelength. Accordingly, in the optical imaging system 600, a filter configuration may be omitted to achieve miniaturization and weight reduction of a camera module.

Figure 12:
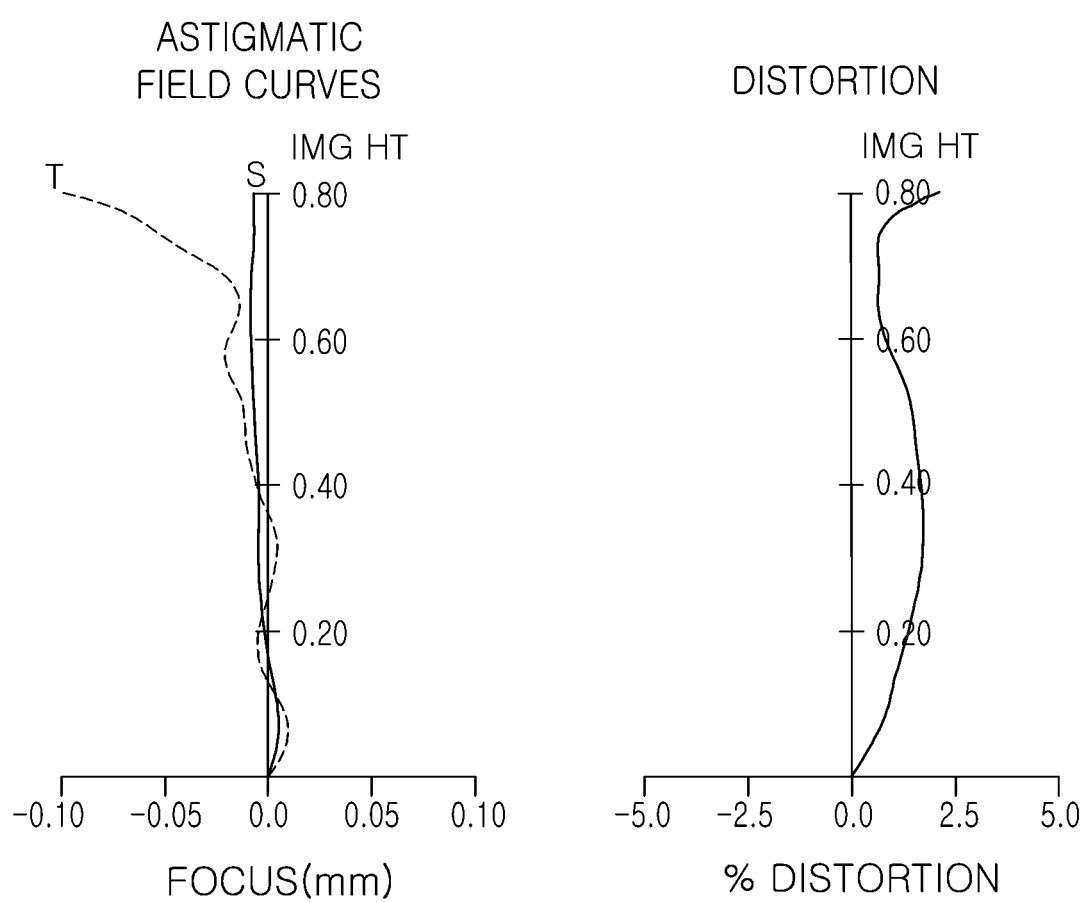
FIG. 12 illustrates an aberration curve of the optical imaging system illustrated in FIG.

Tables 11 and 12 illustrate lens characteristics and aspherical values of the optical imaging system 600, and FIG. 12 illustrates an aberration curve of the optical imaging system 600.

TABLE 11

| Surface No. | Configuration | Radius of Curvature | Thickness/ Distance | Refractive Index | Abbe Number |
|---|---|---|---|---|---|
| S1 | First Lens | 1.0795 | 0.2251 | 1.540 | 56.0 |
| S2 |  | −0.6957 | 0.1644 |  |  |
| S3 | Second Lens | −0.3671 | 0.2256 | 1.652 | 20.4 |
| S4 |  | 0.8597 | 0.0338 |  |  |
| S5 | Third Lens | 0.2036 | 0.3110 | 1.642 | 55.0 |
| S6 |  | 0.5167 | 0.1447 |  |  |
| S7 |  | Infinity | 0.0000 |  |  |
| S8 |  | Infinity | 0.2260 |  |  |
| S9 | Imaging Plane | Infinity | 0.0000 |  |  |

TABLE 12

| | Surface No. | | | | | |
|---|---|---|---|---|---|---|
| | S1 | S2 | S3 | S4 | S5 | S6 |
| K | 3.6601.E−01 | −9.9000.E+01 | −2.9884.E+00 | 2.9608.E−01 | −8.0180.E+00 | −4.2716.E+00 |
| A | 2.0594.E+00 | −3.8411.E+01 | −1.0484.E+01 | −1.2024.E+02 | −2.7204.E+00 | 9.6544.E−01 |
| B | −1.8463.E+03 | 2.5816.E+03 | 4.0213.E+02 | 8.9994.E+03 | −9.1699.E+01 | −9.2556.E+01 |
| C | 3.5849.E+05 | −1.6984.E+05 | −2.8543.E+04 | −6.3020.E+05 | 2.4115.E+03 | 1.3218.E+03 |
| D | −4.4276.E+07 | 7.9447.E+06 | 1.2878.E+06 | 3.4136.E+07 | −3.1037.E+04 | −1.0799.E+04 |
| E | 3.6356.E+09 | −2.5027.E+08 | −2.6193.E+07 | −1.3622.E+09 | 2.5039.E+05 | 5.7010.E+04 |
| F | −2.0623.E+11 | 5.2557.E+09 | −2.3058.E+08 | 3.9850.E+10 | −1.3422.E+06 | −2.0413.E+05 |

TABLE 12-continued

| | Surface No. | | | | | |
|---|---|---|---|---|---|---|
| | S1 | S2 | S3 | S4 | S5 | S6 |
| G | 8.2717.E+12 | −7.4236.E+10 | 3.0575.E+10 | −8.5742.E+11 | 4.8793.E+06 | 5.0826.E+05 |
| H | −2.3749.E+14 | 7.1903.E+11 | −9.2591.E+11 | 1.3587.E+13 | −1.2206.E+07 | −8.9227.E+05 |
| J | 4.8899.E+15 | −4.8419.E+12 | 1.5770.E+13 | −1.5782.E+14 | 2.1193.E+07 | 1.1090.E+06 |

Tables 13 to 14 illustrate optical characteristic values and conditional expression values of the optical imaging systems according to the first to sixth examples.

TABLE 13

| Remark | First Example | Second Example | Third Example | Fourth Example | Fifth Example | Sixth Example |
|---|---|---|---|---|---|---|
| f | 0.7869 | 1.0415 | 1.0242 | 0.7678 | 0.8810 | 0.8252 |
| f2 | −0.3017 | −0.7432 | −0.7237 | −0.4006 | −0.3950 | −0.3762 |
| f3 | 0.3355 | 0.7298 | 0.7368 | 0.4449 | 0.3918 | 0.3837 |
| TTL | 1.4350 | 1.6223 | 1.5484 | 1.3705 | 1.3000 | 1.3306 |
| f | 0.8212 | 1.0205 | 1.0400 | 0.8574 | 0.8303 | 0.8130 |
| ImgH | 1.6080 | 1.8740 | 1.8740 | 1.6080 | 1.6080 | 1.6080 |
| FOV | 86.5400 | 75.7400 | 79.7600 | 83.3400 | 85.3600 | 86.6200 |
| Bfin | 0.0865 | 0.1296 | 0.3520 | 0.2083 | 0.0467 | 0.1989 |

TABLE 14

| Conditional Expression | First Example | Second Example | Third Example | Fourth Example | Fifth Example | Sixth Example |
|---|---|---|---|---|---|---|
| f1/f | 0.9583 | 1.0205 | 0.9848 | 0.8955 | 1.0611 | 1.0150 |
| f2/f | −0.3674 | −0.7283 | −0.6959 | −0.4672 | −0.4757 | −0.4627 |
| f3/f | 0.4086 | 0.7151 | 0.7084 | 0.5189 | 0.4718 | 0.4720 |
| |f1/f2| | 2.6081 | 1.4013 | 1.4152 | 1.9167 | 2.2303 | 2.1934 |
| f1/f3 | 2.3455 | 1.4271 | 1.3902 | 1.7257 | 2.2488 | 2.1503 |
| f2/f3 | −0.8993 | −1.0184 | −0.9823 | −0.9004 | −1.0083 | −0.9804 |
| BFL/TTL | 0.4606 | 0.3622 | 0.3642 | 0.2780 | 0.3247 | 0.2786 |
| Bfin/f | 0.1053 | 0.1270 | 0.3385 | 0.2429 | 0.0562 | 0.2446 |
| TTL/f | 1.7474 | 1.5897 | 1.4889 | 1.5984 | 1.5657 | 1.6367 |
| D12/f | 0.1551 | 0.2220 | 0.2040 | 0.1707 | 0.2027 | 0.2023 |
| V1 − V3 | 35.6000 | 35.6000 | 35.6000 | 34.6000 | 35.6000 | 1.0000 |
| V1 − V2 | 35.6000 | 35.6000 | 35.6000 | 34.6000 | 1.0000 | 35.6000 |
| D12/D23 | 4.2451 | 4.4404 | 5.2550 | 4.5028 | 5.4577 | 4.8677 |
| (R1 + R2)/(R1 − R2) | 0.2866 | 0.0667 | 0.0829 | 0.1774 | 0.0240 | 0.2162 |
| (R5 + R6)/(R5 − R6) | −1.9721 | −4.2312 | −3.9552 | −2.9505 | −2.3443 | −2.3005 |
| (R1 + R2)/T1 | 2.2595 | 0.5510 | 0.6747 | 1.4605 | 0.1920 | 1.7053 |
| (R5 + R6)/T3 | 3.5541 | 2.7080 | 3.0420 | 2.3476 | 2.6843 | 2.3163 |

Figure 13:
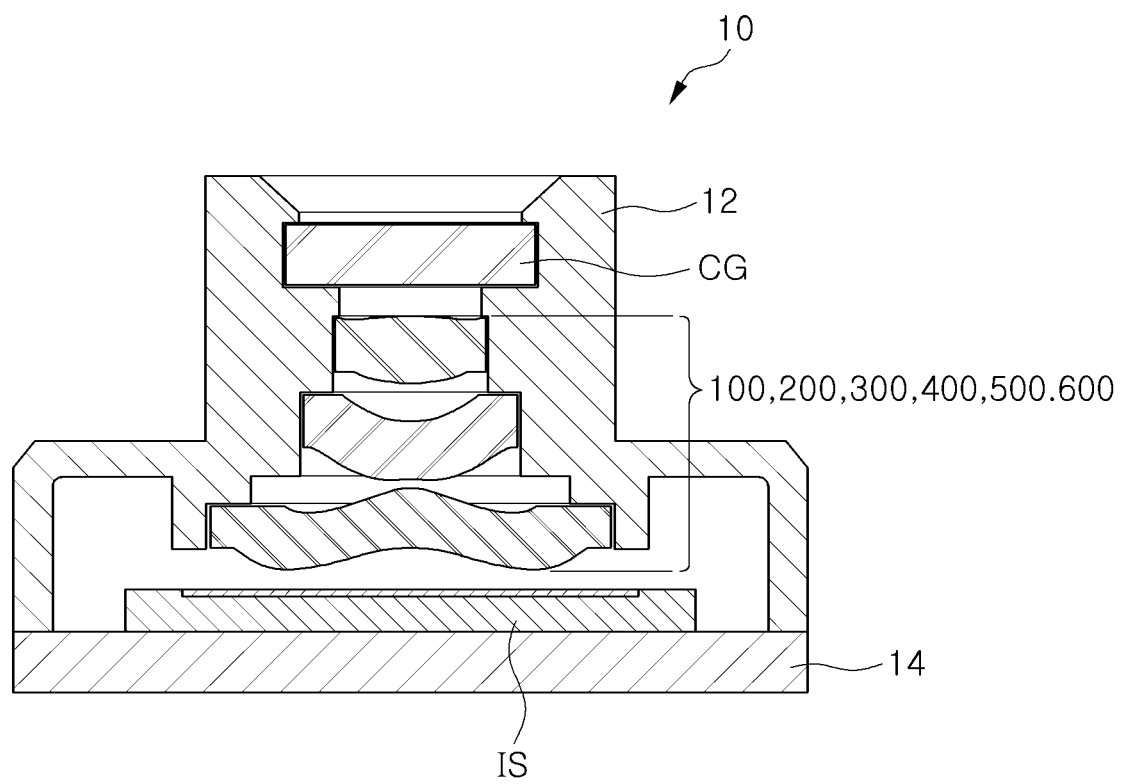
FIG. 13 illustrates a configuration of a camera module according to an example.
Figure 14:
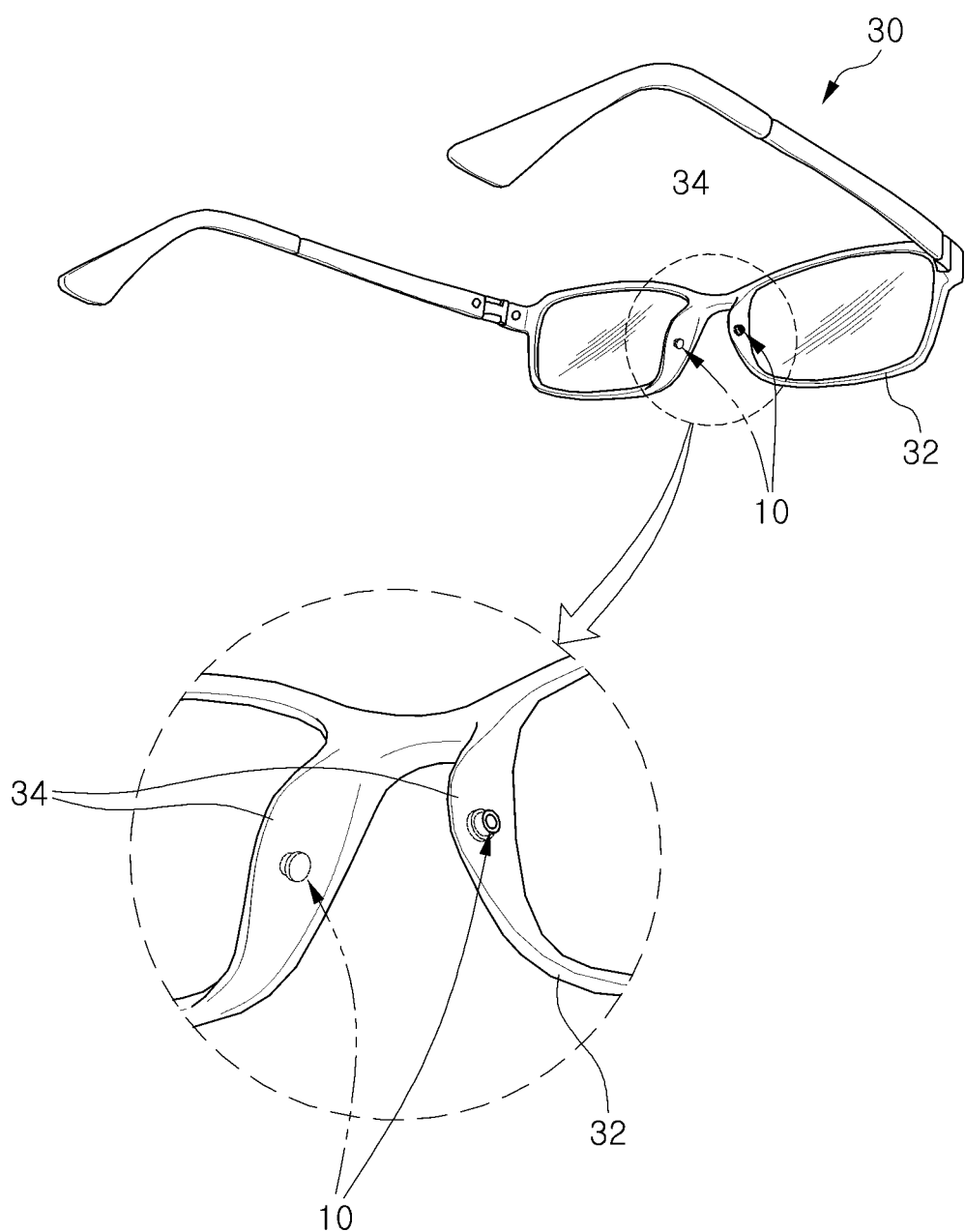
FIG. 14 illustrates a configuration of glasses equipped with the camera module illustrated in FIG. 13.

Hereinafter, a camera module and a portable device mounted equipped therewith according to an example will be described with reference to FIGS. 13 and 14.

The camera module 10 may include a barrel 12 and a substrate 14. However, the configuration of the camera module 10 is not limited to the above-mentioned configuration. For example, the camera module 10 may further include a cover glass CG. The cover glass CG may block the introduction of foreign objects and may reduce transmission of external impact shocks to the inside of the camera module 10.

The barrel 12 may be configured to accommodate a lens. For example, one of the optical imaging systems 100, 200, 300, 400, 500, and 600 according to the first to sixth examples may be accommodated in a barrel 12. The barrel 12 may be configured to facilitate weight reduction of the camera module 10. For example, the barrel 12 may be formed of a plastic material. The barrel 12 may be configured to facilitate miniaturization of the camera module 10. For example, the barrel 12 may be configured to have a minimum size and a minimum volume enabling the optical imaging systems 100, 200, 300, 400, 500, and 600 to be accommodated therein.

The substrate 14 may be configured to be coupled to the barrel 12. For example, the substrate 14 may be attached to one side of the barrel 12 by an adhesive. However, the coupling between the substrate 14 and the barrel 12 is not limited to a bonding manner. Electronic components, required to drive the camera module 10, may be mounted on or embedded in the substrate 14. For example, an image sensor IS may be mounted on the substrate 14. The image sensor IS may be formed in a minimum size or a minimum shape allowing miniaturization of the camera module 10 to be achieved. For example, the image sensor IS may be formed to have a shape in which an image incident by the optical imaging systems 100, 200, 300, 400, 500 and 600 may be inscribed (for example, a square). However, the shape of the image sensor IS is not limited to a square.

The above-configured camera module 10 may be mounted on a portable device. For example, the camera module 10 may be mounted on the glasses 30 manufactured to implement augmented reality (AR) or virtual reality (VR), as illustrated in FIG. 14. The camera module 10 may be configured to capture an image of an eyeball (in detail, an iris) of a wearer. For example, the camera module 10 may be disposed on a nose pad 34 of a glasses frame 32 to capture an image of the iris of the wearer and a movement of the iris in real time.

As described above, according to various examples, weight reduction and miniaturization may be achieved. Therefore, a camera module which may be mounted on glasses having a general shape as well as augmented reality (VR) and virtual reality (VR) devices may be manufactured.

While specific examples have been illustrated and described above, it will be apparent after gaining an understanding of this disclosure that various changes in form and details may be made in these examples without departing from the spirit and scope of the claims and their equivalents. The examples described herein are to be considered in a descriptive sense only, and are not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
a first lens having a convex image-side surface, a second lens, and a third lens disposed in order from an object side,
wherein:

1.2 mm<$TTL$<2.0 mm,

0<f3/f<1.0, where TTL is a distance from an object-side surface of the first lens to an imaging plane, f is a focal length of the optical imaging system, and f3 is a focal length of the third lens, and
a radius of curvature of an object-side surface of the first lens is greater than a radius of curvature of an image-side surface of the third lens.

2. The optical imaging system of claim 1, wherein:
0<f1/f<1.5, where f1 is a focal length of the first lens.

3. The optical imaging system of claim 1, wherein:
−1.0<f2/f<0, where f2 is a focal length of the second lens.

4. The optical imaging system of claim 1, wherein:
|f1/f2|<3.0, where f1 is a focal length of the first lens, and f2 is a focal length of the second lens.

5. The optical imaging system of claim 1, wherein:
−2.0<f2/f3<0, where f2 is a focal length of the second lens.

6. The optical imaging system of claim 1, wherein:
0.25<BFL/TTL<0.5, where BFL is a distance from an image-side surface of the third lens to the imaging plane.

7. The optical imaging system of claim 1, wherein:
Bfin/f<0.35, where Bfin is a back focal length of the optical imaging system when an image of an object disposed at infinity is captured.

8. The optical imaging system of claim 1, wherein:
TTL/f<1.8.

9. The optical imaging system of claim 1, wherein:
D12/f<0.25, where D12 is a distance from an image-side surface of the first lens to an object-side surface of the second lens.

10. The optical imaging system of claim 1, wherein:
1.0≤V1−V3<40, where V1 is an Abbe number of the first lens, and V3 is an Abbe number of the third lens.

11. The optical imaging system of claim 1, wherein
1.0≤V1−V2<40, where V1 is an Abbe number of the first lens, and V2 is an Abbe number of the second lens.

12. An optical imaging system comprising:
a first lens having a convex image-side surface, a second lens having negative refractive power, and a third lens disposed in order from an object side,
wherein:
1.4<TTL/f<1.8, where TTL is a distance from an object-side surface of the first lens to an imaging plane, and f is a focal length of the optical imaging system.

13. The optical imaging system of claim 12, wherein:
1.0<f1/f3<2.6, where f1 is a focal length of the first lens, and f3 is a focal length of the third lens.

14. The optical imaging system of claim 12, wherein:
0.4<f3/f<0.8, where f3 is a focal length of the third lens.

15. The optical imaging system of claim 12, wherein:
4.0<D12/D23<6.0, where D12 is a distance from an image-side surface of the first lens to an object-side surface of the second lens, and D23 is a distance from an image-side surface of the second lens to an object-side surface of the third lens.

16. The optical imaging system of claim 12, wherein a radius of curvature of an object-side surface of the first lens is greater than a radius of curvature of an image-side surface of the third lens.

* * * * *